United States Patent [19]

van der Lely

[11] 3,995,570

[45] Dec. 7, 1976

[54] CULTIVATORS

[76] Inventor: Ary van der Lely, 10, Weverskade, Maasland, Netherlands

[22] Filed: Apr. 15, 1975

[21] Appl. No.: 568,276

[30] Foreign Application Priority Data

Apr. 23, 1974 Netherlands .................... 7405444

[52] U.S. Cl. .................................. 111/85; 111/86; 111/19; 172/123; 172/112; 172/642; 172/72; 172/701

[51] Int. Cl.² ................... A01B 33/16; A01B 49/04

[58] Field of Search ............. 172/701, 71, 72, 112, 172/642, 106, 123; 111/6, 10, 19, 7, 85, 86

[56] References Cited

UNITED STATES PATENTS

| | | | |
|---|---|---|---|
| 36,291 | 8/1862 | Gage | 172/701 |
| 2,754,622 | 7/1956 | Rohnert | 111/6 |
| 2,849,969 | 9/1958 | Taylor | 172/701 |
| 3,456,607 | 7/1969 | West | 172/701 |
| 3,542,133 | 11/1970 | van der Lely | 172/112 |
| 3,661,213 | 5/1972 | Taylor | 172/72 |
| 3,741,137 | 6/1973 | Eisenhardt | 111/6 |

*Primary Examiner*—George J. Marlo
*Attorney, Agent, or Firm*—Mason, Mason & Albright

[57] ABSTRACT

A cultivator has soil working blade members mounted on a horizontal shaft which is driven to rotate the members forwardly through the soil in the normal direction of travel. A baffle comprised of screen segments are mounted on the cultivator frame to partially surround the blade members. The screen segments are biased about respective pivots and a rod grating is connected to the baffle to extend downardly immediately to the rear of the blade members. The rear screen segment has V-shaped guides to ridge the soil. A hopper communicates with dosing outlets, each outlet being a nozzle device that extends between a pair of guides. Each nozzle device is pivotable to either one of two positions for planting tubers deep or shallow. A pair of rear wheels is connected to the rear of the frame and the wheels are drivenly connected to dosing conveyors leading to the outlets. An adjusting device is associated with each wheel to raise and lower the soil working blade members.

15 Claims, 5 Drawing Figures

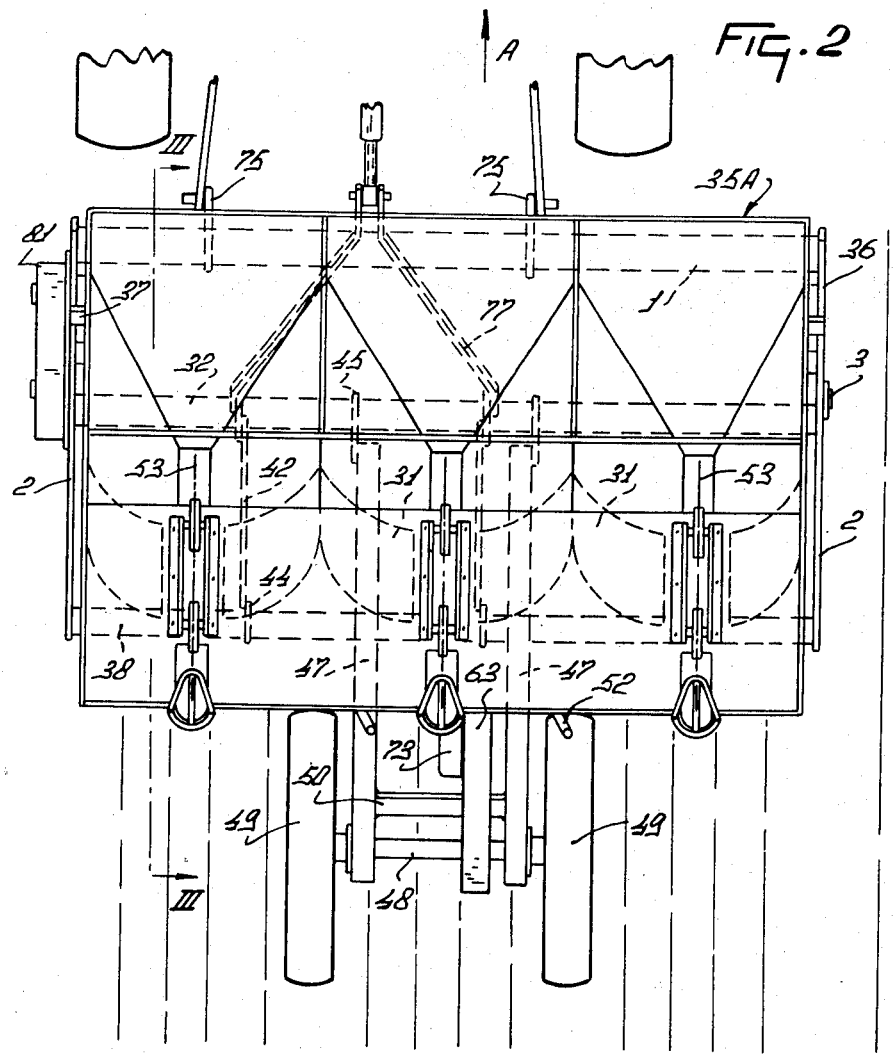

ID
CULTIVATORS

According to the invention, there is provided a cultivator of the kind set forth, wherein at least one pair of soil guide members is disposed behind the soil working members with respect to said direction and at least partly beneath the hood or baffle, and wherein the two soil guide members of the or each pair are disposed in substantially V-shaped relationship in such a way as to form soil displaced by the soil working members during the use of the cultivator into a corresponding ridge.

Figure 1:
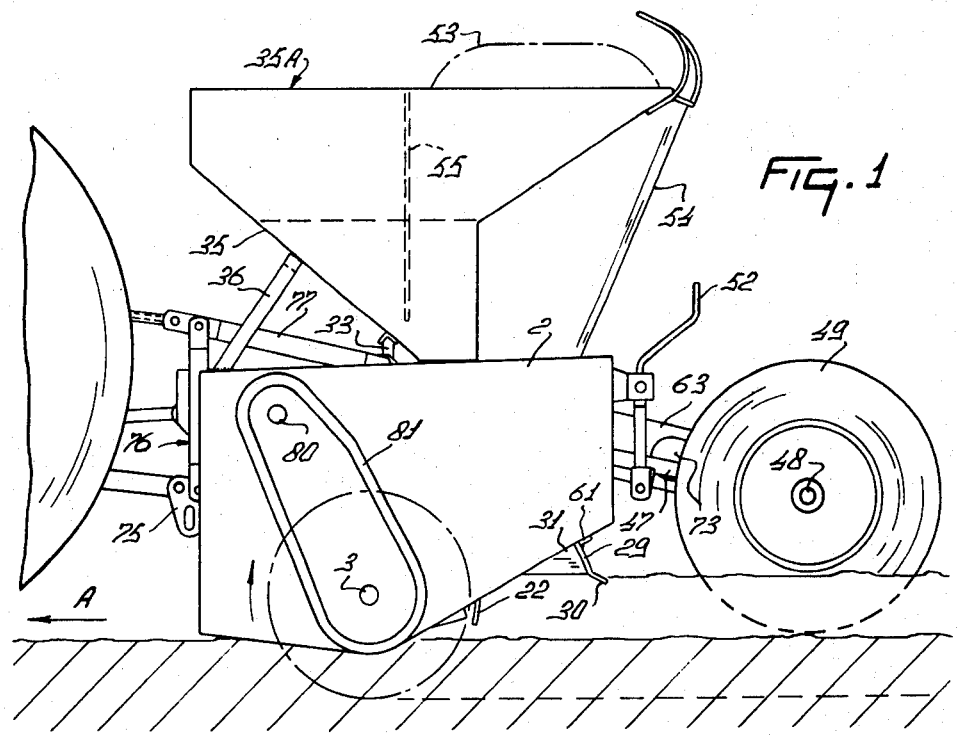
Figure 5:
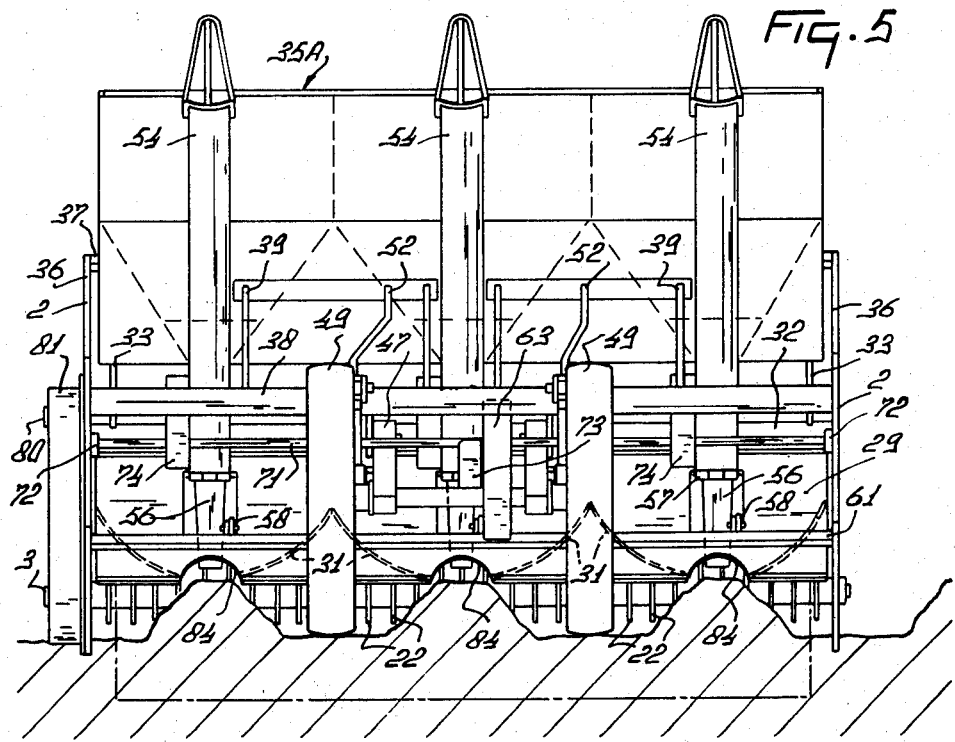
Figure 3:
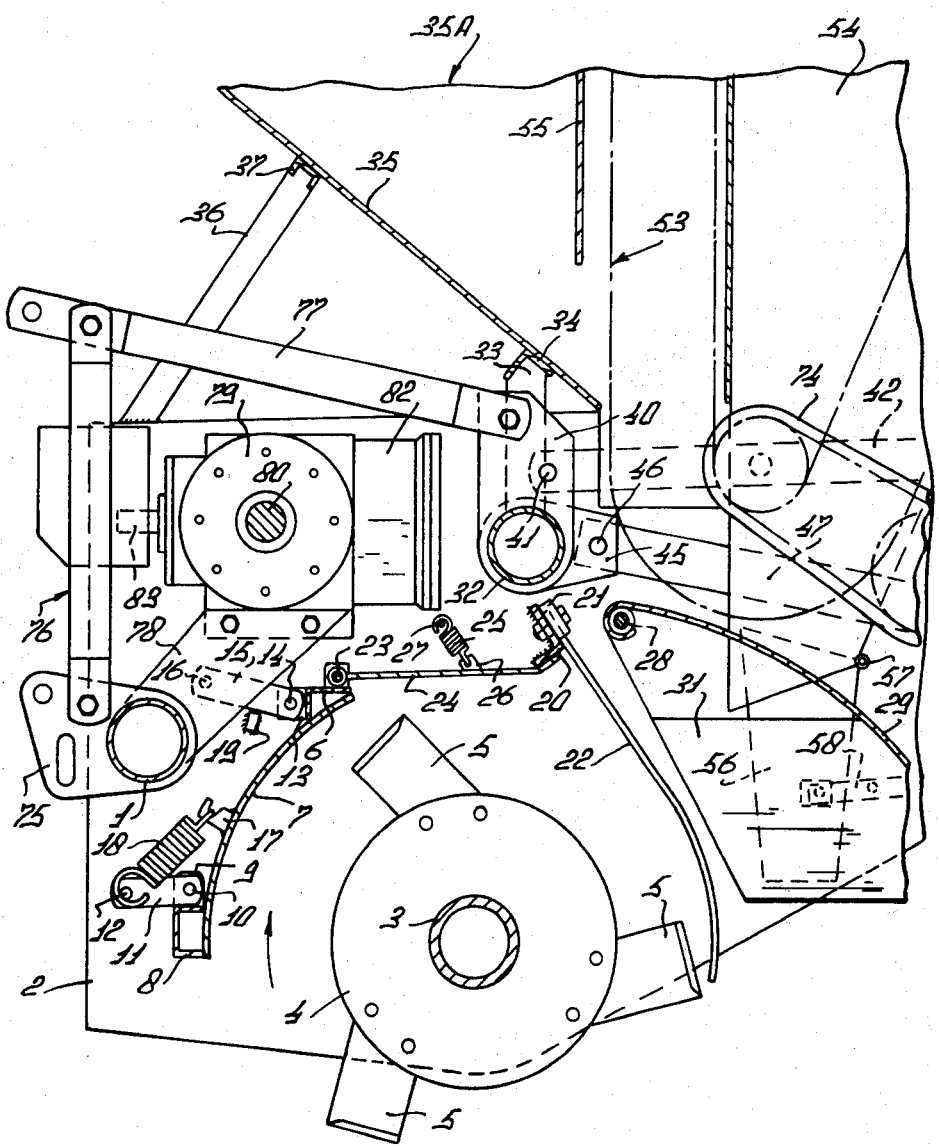
Figure 4:
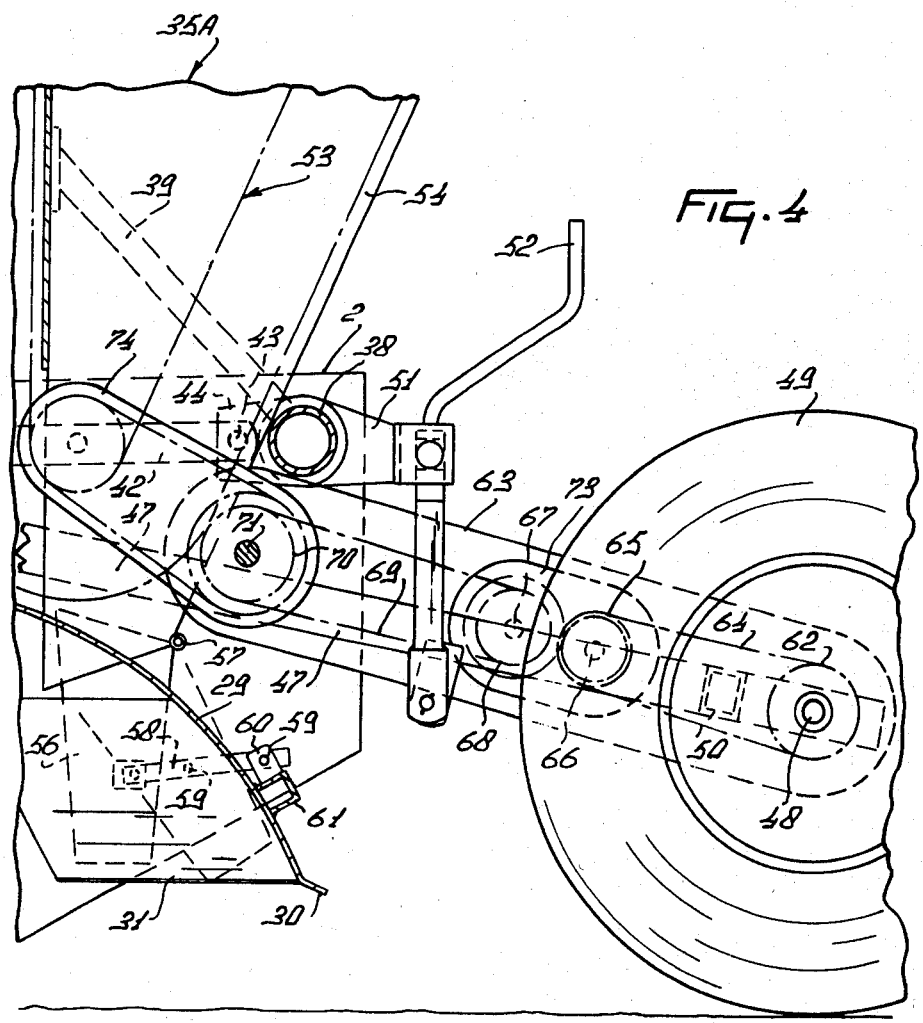

For a better understanding of the invention, and to show how the same may be carried into effect, reference will now be made, by way of example, to the accompanying drawings, in which:

FIG. 1 is a side elevation of a soil cultivating implement or cultivator in accordance with the invention connected to the rear of an agricultural tractor, FIG. 2 is a plan view of the cultivator of FIG. 1, FIG. 3 is a section, to an enlarged scale, of a front region of the cultivator taken on a line III—III in FIG. 2, FIG. 4 is a section, to the same scale as FIG 3, of the rear part of the cultivator taken on the line III—III in FIG. 2, and FIG. 5 is a rear elevation of the cultivator.

Referring to the drawings, the soil cultivating implement or cultivator that is illustrated has a frame which comprises a main beam 1 that extends substantially horizontally transverse, and normally substantially horizontally perpendicular, to the intended direction of operative travel of the cultivator which is indicated by an arrow A in FIGS. 1 and 2 of the drawings. The opposite ends of the main frame beam 1 are rigidly secured to two vertically disposed side plates 2 that both extend rearwardly from the main frame beam 1 with respect to the direction A in substantially parallel relationship with one another and with that direction. As seen in side elevation (FIG. 1), each plate 2 has a straight upper edge which is inclined to the horizontal by a few degrees in such a way that the leading end of that edge with respect to the direction A is at a lower horizontal level than is the rearmost end thereof. The lowermost edge of each plate 2 is shaped in such a way that it has a leading (with respect to the direction A) straight portion that is inclined rearwardly and downwardly at a few degrees to the horizontal from its leading end and a straight rear portion which is inclined more steeply to the horizontal than is the leading portion and which extends from its junction with that portion to the rearmost edge of the plate 2 concerned. It will be seen from FIG. 1 of the drawings that the junctions between the leading and rear straight portions of the lower edge of each plate 2 are disposed a short distance in front of the center of the plate with respect to the direction A. Substantially vertically above the junctions between the lower edge portions of the plates 2, a substantially horizontal rotary shaft 3 is mounted in aligned bearings (not shown) carried by the plates 2. The shaft 3 carries a plurality of soil working members in the form of blades 5 (FIG. 3) at regular intervals along its length. The blades 5 are, in fact, indirectly secured to the shaft 3 by circular plates 4, the blades 5 being fastened to the peripheries of those plates. Each plate 4 carries three blades 5 that are spaced apart from one another at 120° intervals around the axis of the shaft 3 and it will be noted that the blades 5 on successive plates 4 along the shaft 3 are angularly offset around the axis of that shaft in such a way that, considered lengthwise along the shaft 3, there are three helically wound rows of the blades 5 in spaced apart relationship with one another. Each blade 5 comprises an inner substantially radial portion and an outermost end that is bent over through substantially 90° so as to extend substantially parallel to the longitudinal axis of the shaft 3.

A beam 6 (FIG. 3) of L-shaped cross-section rigidly interconnects the two plates 2 and is in substantially parallel relationship with the main frame beam 1 and the rotary shaft 3. A screen 7 is secured to the beam 6 and partially surrounds the shaft 3 and its blades 5 in a generally upper forward region of the latter with respect to the direction A. It will be seen from FIG. 3 of the drawings that the screen 7 is of cylindrically curved formation, its central axis of curvature being substantially coincident with the axis of rotation of the shaft 3 with the screen 7 subtending an angle of less than 90° at said axis of rotation. An upper edge region of the screen 7 is secured to the beam 6 and said screen extends downwardly and forwardly with respect to the direction A away from the beam 6. A further hollow beam 8 is fastened to the lower edge region of the screen 7 in parallel relationship with the beam 6, said further beam 8 being provided, close to the two plates 2, with corresponding lugs 9 that are fastened to its top. The ends of arms 11 are pivotally connected to the lugs 9 by substantially horizontally aligned pins 10 that define an axis which is parallel to the beams 6 and 8. The arms 11 extend substantially horizontally forwards away from the pivot pins 10 and their opposite ends are pivotally connected to the corresponding plates 2 themselves by further parallel pins 12. The beam 6 is similarly provided, close to the two plates 2, with forwardly projecting lugs 13 to which the ends of arms 15 are pivotally connected by substantially horizontally aligned pins 14 which are parallel to the pins 10 and 12. The arms 15 extend forwardly and upwardly at a few degrees to the horizontal from the pivot pins 14 and their leading ends are pivotally connected to the two plates 2 themselves by further parallel pins 16. It can be seen from FIG. 3 of the drawings that rearward (with respect to the direction A) extensions of the longitudinal axes of the illustrated arms 11 and 15 would intersect at a point well to the rear of the shaft 3. Anchorages 17 are fastened to the screen 7 near to the two plates 2 and tension springs 18 are stretched between those anchorages and the corresponding pivot pins 12. The springs 18 thus urge the screen 7 generally downwardly and normally maintain the lowermost edges of the upper arms 15 in abutting engagement with stops 19 that are carried by the two plates 2.

The two plates 2 are also interconnected by a second beam 20 of L-shaped cross-section which beam 20 extends parallel to the beams 6 and 8 at a level just above that of the beam 6 and at a location a short distance behind the shaft 3 with respect to the direction A. A plurality of clamps 21, which include bolts, secure the junctions between integral pairs of spring steel rods 22 to the beam 20 in such a way that said rods 22 extend in regularly spaced apart relationship (see FIG. 5) across the working width of the cultivator between the two plates 2 and form a grating. Each rod 22 has an upper straight portion that is inclined downwardly, and rearwardly with respect to the direction A, away from the corresponding clamp 21 and whose lowermost end merges integrally into a lower curved portion whose center of curvature coincides, or sustantially coincides, with the axis of rotation of the shaft 3. The lowermost free end or tip of each rod 22 is located at a level which is substantially the same as that of the axis of rotation of the shaft 3 although, in the illustrated embodiment, at a slightly lower level than that of said axis. Each rod 22 is contained in a corresponding plane which is substantially perpendicular to the axis of rotation of the shaft 3. A substantially horizontal pivot shaft 23 is carried on top of the beam 6 and a second screen 24 that extends rearwardly from said shaft 23 with respect to the direction A is turnable upwardly and downwardly about the pivot shaft 23. Lugs 26 are mounted on top of the second screen 24 at locations close to the two plates 2 and tension springs 25 are stretched between those lugs 26 and anchorage pins 27 carried by the plates 2. The springs 25 tend to turn the second screen 24 upwardly about the axis of the pivot shaft 23 and thus urge the top of a rear edge region of that screen into abutting engagement with the lower limb of the L-shaped cross-section beam 20, said rear edge region of the second screen 24 being bent over upwardly through a few degrees (see FIG. 3).

A shaft 28 that is parallel to the shaft 3 extends between the two side plates 2 at the same level as that of the beam 20 but at a short distance behind that beam with respect to the direction A. The shaft 28 supports a third screen 29 (FIGS. 3 and 4), said third screen 29 being afforded principally by a cylindrically curved portion whose center of curvature is coincident, or substantially coincident, with the axis of rotation of the shaft 3, said portion extending throughout substantially the whole of the working width of the cultivator between the two plates 2. An upwardly and rearwardly bent-over rim 30 at the rearmost edge of the third screen 29 is located at substantially the same horizontal level as is the shaft 3. Three pairs of plate-shaped guide members 31 are arranged beneath the third screen 29 with the two guide members 31 in each pair in V-shaped relationship with one another. It can be seen in FIGS. 3 and 4 of the drawings that lower edge of each plate of each guide member 31 is substantially horizontally disposed while a front edge thereof is steeply inclined to the horizontal and to the axis of rotation of the shaft 3. In fact, the two guide members 31 of each pair are upwardly and outwardly curved away from each other (see FIGS. 2 and 5), their lowermost substantially horizontal edges being closer to one another than their upper edges. The upper edges adjoin the concave side of the third screen 29 while the leading ends of their lowe substantially horizontal edges terminate near the spring steel rods 22. The previously mentioned front edges that are steeply inclined to the horizontal extend from the leading ends of the substantially horizontal edges to locations adjacent to the shaft 28. The first, second and third screens 7, 24 and 29 together afford a hood or baffle and it will be noted from FIG. 3 of the drawings that the uppermost points on the plate-shaped guide members 31 substantially coincide with the uppermost level of that hood or baffle.

A frame beam 32 that is substantially parallel to the main frame beam 1 rigidly interconnects the two side plates 2 at a location immediately above the beam 20 and carries vertical supports 33 that are spaced apart from one another along the length of the beam 32. The tops of the supports 33 are interconnected by a beam 34 of L-shaped cross-section that is substantially parallel to the beams 1 and 32. The beam 34 constitutes a support for a hopper 35 that extends throughout the working width of the cultivator, the hopper 35 also being sustained by two support arms 36 that have lower ends which are welded or otherwise rigidly secured to the upper edges of the two side plates 2 and upper ends that are fastened to a bar 37 of substantially inverted channel-shaped cross-section which extends throughout the width of the front of the hopper 35. As can be seen in the drawings, the two support arms 36 are inclined to both the horizontal and the vertical, their lowermost ends being foremost with respect to the direction A. A further frame beam 38 rigidly interconnects the two side plates 2 near the uppermost and rearmost corners of those two plates and is in parallel relationship with the frame beams 1 and 32. This further frame beam 38 affords a support for the rear of the hopper 35 by way of four supporting arms 39 (FIGS. 4 and 5) which interconnect the beam 38 and strips that are fastened to the rear wall of the hopper, said arms 39 being inclined to both the horizontal and the vertical in such a way that their uppermost ends are foremost with respect to the direction A. The hopper 35 forms part of a planting mechanism 35A for tuber crops, and particularly for potato tubers that are advantageously grown in ridged soil. The planting mechanism 35A will be described in further detail below.

In addition to the supports 33, the frame beam 32 is provided with two upright plates 40 that are disposed in spaced apart relationship. Two strips 42 extend rearwardly from the corresponding plates 40 to which plates they are pivotally connected by substantially horizontally aligned pins 41. The rearmost ends of the two strips 42 are pivotally connected by further parallel pins 43 to brackets 44 fastened to the further frame beam 38. The frame beam 32 also carries two rearwardly directed lugs 45 at locations that are spaced from opposite sides of the midpoint of the beam 32 and the leading ends of two arms 47 are pivotally connected to the corresponding lugs 45 by substantially horizontally aligned pins 46. The arms 47 are inclined downwardly, and rearwardly with respect to the direction A, away from the frame beam 32 and their rearmost ends (FIG. 4), that are located behind the side plates 2, rotatably support a substantially horizontal shaft 48 to the opposite ends of which two large ground wheels 49 are secured, said ground wheels 49 being disposed beyond the furthest remote sides of the two arms 47 (see FIG. 2). A tie beam 50 perpendicularly interconnects the two arms 47 at a short distance in front of the shaft 48. Two pairs of lugs 51 project rearwardly from the frame beam 38 to locations that are rearwardly beyond the side plates 2, said pairs of lugs 51 carrying, at their rearmost ends, height adjustment assemblies which incorporate cranked screw-threaded spindles 52. Such assemblies are well known per se and it is not therefore necessary to describe them in detail nor to illustrate their internal construction in the drawings. The bottom of each assembly is formed with a fork which is pivotally connected to a bracket secured to a corresponding one of the two arms 47 and it will be evident that rotation of the two spindles 52 in an appropriate direction will turn the arms 47 and the parts which they carry either upwardly, or downwardly, about the axis defined by the pivot pins 46 relative to the remainder of the cultivator.

The planting mechanism 35A is provided with three equidistantly spaced apart flow control or dosing devices 53 that are of constructions which are known per se, the three devices 53 being located at the rear of the hopper 35 with respect to the direction A. Each flow control or dosing device 53 includes an endless conveyor at least part of which is located in a corresponding housing 54 and it will be noted from FIG. 1, in particular, of the drawings that, in front of the three devices 53 with respect to the direction A, a substantially vertical plate 55 that is parallel to the axis of rotation of the shaft 3 extends downwardly inside the hopper 35 from the top thereof to a location close to, but spaced above, the inclined bottom wall of that hopper. The plate 55 prevents the receiving regions of the endless conveyors from being overloaded by an excessive number of seed potatoes or other tubers from the hopper 35. Each of the three housings 54 is of downwardly tapering configuration and is provided at its bottom with a corresponding generally funnel-shaped tuber introducing member 56. Each member 56 is entered through a corresponding opening in the third screen 29 and has its delivery end located midway between the two guide members 31 of a corresponding pair of those members. As will be seen in FIG. 5 of the drawings, the lowermost delivery ends of the members 56 are disposed just above the level of the bottoms of the guide members 31. The upper end of each generally funnel-shaped tuber introducing member 56 is disposed inside the corresponding housing 54 and is pivotally connected to that housing by a corresponding shaft 57 (FIGS. 3 and 4) which is located at the back of the housing 54 concerned with respect to the direction A. Each of the members 56 can be set in either of the two possible alternative positions that are shown in FIG. 4 of the drawings in one of which positions the member 56 concerned is substantially vertically disposed and in the other position it is rearwardly inclined from top to bottom with respect to the direction A. To this end, each tuber introducing member 56 has one end of a corresponding rod 58 pivotably connected to it, each rod 58 carrying two alternative pins 59 either chosen one of which can be entered through a hole in a corresponding retaining lug 60 carried by a hollow beam 61 which extends between the two side plates 2 at the rear of the third screen 29.

The shaft 48 which extends between the rearmost ends of the two arms 47 is rotatably mounted in bearings carried by those arms and, between the two ground wheels 49, carries a sprocket wheel 62. An endless transmission chain 64 drivingly connects the sprocket wheel 62 to a sprocket wheel 65 mounted on a shaft 66 supported in the walls of a chain casing 63 in such a way that one end of the shaft 66 projects through one wall of the casing 63 at a location substantially midway between the opposite ends of that casing. A second shaft 67 is rotatably mounted in the walls of the chain casing 63 in a similar manner to the shaft 66 and at a location quite close to that shaft 66, one end of the shaft 67 also projecting through the same wall of the casing 63 as does one end of the shaft 66. The shaft 67 is provided, inside the casing 63, with a sprocket wheel 68 and an endless transmission chain 69 places that sprocket wheel 68 in driving connection with a further sprocket wheel 70 fastened to a shaft 71 that is close to the leading end of the casing 63 with respect to the direction A. The shaft 71 projects from both sides of the chain casing 63 and its opposite ends are rotatably mounted in substantially horizontally aligned bearings 72 (FIG. 5) carried by the two side walls 2. The ends of the two shafts 66 and 67 that project through one side wall of the chain casing 63 are splined or otherwise keyed and form parts of a change-speed gear 73 which comprises pairs of interchangeable and/or exchangeable toothed pinions of different sizes, any selected co-operating pair of those pinions being capable of being slid axially onto the splined or otherwise keyed ends of the two shafts 66 and 67 to provide a corresponding transmission ratio between those shafts. The change-speed gear 73 also comprises a protective housing which is securable to the side wall of the casing 63 in a quickly releasable manner. The shaft 71 is a driving shaft for the endless conveyors of the three flow control or dosing devices 53, the drive from said shaft 71 being transmitted to the devices 53 by way of three chain and sprocket wheel transmissions 74 that are accommodated in corresponding chain casings.

Two coupling plates 75 are secured to the main frame beam 1 so as to project forwardly from that frame beam with respect to the direction A in horizontally spaced apart relationship. The plates 75 form part of a coupling member or trestle 76 by which the frame of the cultivator can be connected to the three-point lifting device or hitch of an operating agricultural tractor or other vehicle in the generally known manner that is illustrated in the drawings. It will be noted from FIG. 2 of those drawings that the coupling member or trestle 76 is offset to the left of the cultivator from the center of the latter as viewed in the direction A. An upper coupling point of the coupling member or trestle 76 is afforded by the leading ends of two strip-shaped bars 77 whose rearmost ends are rigidly secured to the two upright plates 40 (FIG. 3), the bars 77 converging forwardly from those plates (see FIG. 2). At a location that is disposed substantially centrally of the coupling member or trestle 76, the main frame beam 1 carries a pair of upwardly and rearwardly inclined support plates 78 (FIG. 3) to the top and rear of which a gear box 79 is fastened. The gear box 79 forms part of a drive transmission to the rotary shaft 3 and is provided with a rotatable output shaft 80 that extends substantially parallel to the frame beam 1 inside a tubular casing. The end of the shaft 80 that is remote from the gear box 79 is disposed inside a protective casing 81 (FIGS. 1, 2 and 5) which casing 81 contains transmission members that place the shaft 80 in driving connection with one end of the rotary shaft 3. The gear box 79 comprises bevel pinions (not visible) and a further change-speed gear 82 by which the shaft 80 can be placed in driven connection with a rotary input shaft 83 of the gear box whose leading splined or otherwise keyed end projects forwardly from the front of the gear box in substantially the direction A. The change-speed gear 82 is basically similar to the change-speed gear 73 that has been briefly described above and it will therefore be evident that a required transmission ratio between the input shaft 83 and the output shaft 80 can be obtained by employing an appropriate pair of co-operating pinions inside the change-speed gear 82.

In the use of the cultivator which has been described, its coupling member or trestle 76 is connected to the three-point lifting device or hitch at the rear of an agricultural tractor or other vehicle and the leading splined or otherwise keyed end of the rotary input shaft 83 of the gear box 79 is placed in driven connection with the power take-off shaft of the same tractor or other operating vehicle by way of an intermediate telescopic transmission shaft that is of a construction which is known per se having universal joints at its opposite ends. Part of that transmission shaft is visible in FIG. 1 of the drawings. Upon moving in the direction A over land that is to be cultivated with rotary power applied to the input shaft 83 of the gear box 79, the shaft 3 and its blades 5 will rotate in the direction that is indicated by an arrow in FIGS. 1 and 3 of the drawings, this direction being such that the blades 5 are driven forwardly through the soil with respect to the direction A. The soil that is displaced by the rapidly moving blades 5 is thrown upwardly in front of the shaft 3 by those blades and rearwardly over the top of that shaft beneath the partly resiliently yieldable hood or baffle that is afforded by the three screens 7, 24 and 29. The displaced soil is thus thrown against the spring steel rods 22 and any hard lumps thereof, stones, root debris and the line cannot pass between the rods 22 and slide downwardly in front thereof to be buried at the bottom of the broad furrow that is excavated by the blades 5. Lighter well crumbled soil, on the other hand, passes readily between the rods 22 and is guided downwardly towards the ground surface by the third screen 29 and by the guide members 31. This loose soil buries any hard soil or obstacles that could not pass between the rods 22 and is formed by the three pairs of guide members 31 into three ridges that extend longitudinally parallel to the direction A in the manner which can be seen best in FIG. 5 of the drawings. In the cultivator which is being described as an example, there are three pairs of the guide members 31 but this is not, of course, essential. The maximum distance between the tops of two guide members 31 of one pair is substantially one-third of the working width of the cultivator (i.e. the axial length of the shaft 3). The ridges that are formed by the pairs of guide members 31 have substantially predetermined heights and widths and thus contain substantially predetermined volumes of displaced soil per unit length. The dimensions meet the requirements for the ridge cultivation of potatoes. Seed potatoes (or other tubers) can be introduced into the soil ridges during the formation thereof by the members 56, the seed potatoes or other tubers being supplied from the hopper 35 by the three flow control or dosing devices 53. The depth of planting of the seed potatoes of other tubers in the ridges can be changed by adjusting the positions of the tuber inintroducing members 56. If each member 56 is substantially vertically disposed, the seed potatoes or other tubers will be planted at a depth which is greater than that which will result if the downwardly and rearwardly inclined dispositions of the members 56 are adopted. The flow control or dosing devices 53 are indirectly driven from the ground wheels 49 at a speed which, of course, will be dependent upon the speed of travel of the cultivator over the ground. If a greater or lesser spacing between individual seed potatoes or other tubers in each soil ridge is required, this can be brought about by changing the toothed pinions, or toothed pinion arrangement, in the change-speed gear 73 that is carried at one side of the chain casing 63. If the speed of rotation of the shaft 71 is increased, the seed potatoes or other tubers will be planted closer together whereas, if the speed of rotation of the shaft 71 is reduced, they will be further spaced apart. It will be noted from FIG. 5 of the drawings that semicircular recesses 84 are formed in the rim 30 and rearmost edge region of the third screen 29 in register, in the direction A, with each of the three tuber introducing members 56. These recesses 84 enable the third screen 29 to clear the tops of the ridges that are formed but can, with appropriate adjustment of the height setting of the cultivator, be employed to round off the tops of the ridges. The depth of penetration of the blades 5 into the ground and the height of other parts of the cultivator above the ground surface is adjusted, as may be required, by rotating the cranked spindles 52 in appropriate directions to turn the arms 47 and the parts which they carry (particularly the ground wheels 49) upwardly or downwardly about the pivot pins 46. It will be realised that, if the blades 5 are set to penetrate more deeply into the ground surface, the amount of soil which they displace will be correspondingly increased and vice versa. The speed of rotation of the shaft 3 which carries the blades 5 can be increased or decreased, without changing the speed of rotation applied to the input shaft 83, by an appropriate choice of co-operating pinions within the change-speed gear 82. The speed of rotation of the shaft 3 can thus be set at a value which matches the nature and condition of the soil that is to be cultivated and/or the depth of penetration of the blades 5 into the ground surface for which the cultivator has been adjusted.

The cultivator that has been described which incorporates the planting mechanism 35A is of a compact and effective construction which is such that the cultivator can readily be carried by the three-point lifting device or hitch of an agricultural tractor. Even when starting with a field that is in a rough state of cultivation, the cultivator that has been described can satisfactorily work the soil of that field and simultaenously plant seed potatoes or other tubers in ridges as a result of single traverses of the field by the cultivator. This constitutes a significant improvement as compared with the methods of soil preparation and subsequent seed potato or other tuber planting that have previously been employed. Although the provision of the planting mechanism for seed potatoes or other tubers has been described, it should be noted that the mechanism 35A could readily be replaced by an alternative mechanism for introducing materials onto and/or into the soil. Such materials could, for example, be seeds, granular or powdered artificial fertilisers, herbicides, pesticides or the like.

Although various features of the soil cultivating implement or cultivator that have been described and/or that are illustrated in the accompanying drawings will be set forth in the following claims as inventive features, it is emphasised that the invention is not necessarily limited to those features and that it includes within the scope each of the parts of the soil cultivating implement that has been described and/or that has been illustrated in the accompanying drawings both individually and in various combinations.

What we claim is:

1. A cultivator having a frame and soil working members rotatably mounted on said frame, driving means connected to said members to move same through the soil, baffle means being positioned adjacent said members and said baffle means including a screen and a pair of soil guide members with spaced apart lower edges positioned to the rear of the soil working members with respect to the normal direction of travel of the cultivator to receive worked soil from said soil working members, said pair of guide members extending upwardly and outwardly from said lower edges in substantially V-shaped relationship to one another in said edges being spaced apart to leave a gap through which worked soil received at the rear of rotatably soil working members is ridged.

2. A cultivator as claimed in claim 1, wherein a dosing device for introducing material onto and/or into the soil is located between said pair of guide members and directly above said gap.

3. A cultivator having a frame supporting a hopper and soil working members rotatably mounted on said frame, driving means connected to said members to move same through the soil, a baffle comprising a screen being located adjacent and to the rear of said members with respect to the normal direction of travel and said screen includng at least one pair of soil guide members that is positioned at the lower portion of said screen, said pair of guide members being positioned adjacent the soil during operation and extending upwardly and outwardly from the soil in substantially V-shaped relationship to one another, said guide members being spaced apart from one another to leave a gap that forms a ridge of worked soil received via said screen, dosing means communicating with said hopper and said dosing means including an outlet located between said guide members above said gap to introduce material in the worked soil.

4. A cultivator as claimed in claim 3, wherein guide members have front edges that face said soil working members and are inclined downwardly and rearwardly with respect to the direction of travel, said guide members being curved upwardly and outwardly from lower edges thereof and said lower edges extending substantially horizontally.

5. A cultivator as claimed in claim 3, wherein a recess is formed in said screen in register with said gap between the lower edges of the two guide members of said pair, the center of said recess being contained in a plane that extends substantially parallel to the direction of travel, said plane passing midway between said guide members.

6. A cultivator as claimed in claim 3, wherein there are a plurality of pairs of soil guide members positioned side-by-side at the rear of said soil working members and these members are mounted on a substantially horizontal shaft.

7. A cultivator as claimed in claim 6, wherein said baffle includes a grating and the latter is positioned between the soil working members and said guide members, said grating comprising a plurality of rods positioned to pass fine soil to said guide members.

8. A cultivator as claimed in claim 7, wherein said rods are curved with their centers of curvature coinciding with said shaft, the lower extremities of said rods being located at a level at least as low as that of the lower edges of said guide members.

9. A cultivator as claimed in claim 6, wherein a nozzlelike device of said dosing means is located between the two guide members of each pair and a delivery opening of said device is located at substantially the same level as lower edges of said two members, said device being entered through an opening in said screen.

10. A cultivator as claimed in claim 9, wherein each device has adjusting means to set same in either chosen one of two alternative positions, said device being pivotable between said two positions about an axis that is substantially parallel to the longitudinal axis of said shaft.

11. A cultivator as claimed in claim 10, wherein each device is substantially funnel-shaped and forms part of a tuber planting mechanism.

12. A cultivator as claimed in claim 3, wherein two horizontally spaced apart ground wheels are connected by arm means to said frame at the rear thereof to support the cultivator, means adjusting said two ground wheels upwardly and downwardly with respect to said frame and said arm means, together with said wheels, having retaining means that secures the arm means and wheels in any chosen height adjustment relative to said frame.

13. A cultivator as claimed in claim 3, wherein said hopper extends throughout substantially the whole width of said cultivator, said dosing outlet being located rearwardly of said hopper with respect to the direction of travel and a flow control being positioned between said outlet and said hopper, the rear of said frame being supported on ground wheels and said flow control being drivenly connected to a transmission drivenly connected to said ground wheels during travel, said transmission being located between said ground wheels.

14. A cultivator as claimed in claim 3, wherein said soil working members are mounted on a substantially horizontal shaft and said shaft is connected to a drive transmission for rotation in a direction forwardly through the soil with respect to the direction of travel to throw soil up and over the shaft to said screen at the rear, said baffle extending forwardly from said screen to a location in front of said soil working members.

15. A cultivator having a frame and soil working members rotatably mounted on said frame, driving means connected to said members to move same through the soil, a baffle being located adjacent said members and said baffle comprising a plurality of screens that are separately pivoted to said frame, a rear screen including at least one pair of spaced apart soil guide members, a grating of said baffle extending downwardly in front of said rear screen and to the rear of the soil working members with respect to the normal direction of travel, said soil working members being mounted on a substantially horizontal shaft, said driving means connected to rotate said soil working members to throw soil through said grating to said guide members, dosing means, including a nozzle-like device, extending between the guide members and above a gap formed between these members, said dosing means including conveyor means, further driving means connected to move said conveyor means and deliver material to soil being ridged by said guide members.

* * * * *